United States Patent
Lee et al.

(10) Patent No.: US 10,149,279 B2
(45) Date of Patent: Dec. 4, 2018

(54) METHOD FOR TRANSMITTING MULTI-USER FRAME IN WIRELESS LAN SYSTEM

(71) Applicant: LG ELECTRONICS INC., Seoul (KR)

(72) Inventors: Wookbong Lee, Seoul (KR); Kiseon Ryu, Seoul (KR); Jinyoung Chun, Seoul (KR); Hangyu Cho, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/315,650

(22) PCT Filed: Jun. 1, 2015

(86) PCT No.: PCT/KR2015/005472
§ 371 (c)(1),
(2) Date: Dec. 1, 2016

(87) PCT Pub. No.: WO2015/186941
PCT Pub. Date: Dec. 10, 2015

(65) Prior Publication Data
US 2017/0195992 A1    Jul. 6, 2017

Related U.S. Application Data

(60) Provisional application No. 62/006,241, filed on Jun. 1, 2014.

(51) Int. Cl.
*H04W 72/00* (2009.01)
*H04W 84/12* (2009.01)
(Continued)

(52) U.S. Cl.
CPC ......... *H04W 72/005* (2013.01); *H04L 5/0055* (2013.01); *H04L 27/2657* (2013.01);
(Continued)

(58) Field of Classification Search
None
See application file for complete search history.

(56) References Cited

U.S. PATENT DOCUMENTS

2011/0044188 A1*  2/2011  Luo ............... H04L 27/2607
                                              370/252
2011/0116487 A1   5/2011  Grandhi
(Continued)

OTHER PUBLICATIONS

PCT International Application No. PCT/KR2015/005472, Written Opinion of the International Searching Authority dated Sep. 7, 2015, 22 pages.

*Primary Examiner* — Kodzovi Acolatse
(74) *Attorney, Agent, or Firm* — Lee Hong Degerman Kang Waimey

(57) ABSTRACT

A method by which an STA transmits a multi-user (MU) frame in a wireless communication system, according to one embodiment of the present invention comprises the steps of: receiving, from an access point (AP), a second downlink frame including time synchronization information and frequency synchronization information; adjusting a time synchronization and a frequency synchronization by using the time synchronization information and the frequency synchronization information; receiving a third downlink frame including MU frame allocation information; and transmitting the MU frame according to the MU allocation information, wherein the time synchronization information is determined by comparing, to a reference value, a difference of measurement values relating to frames exchanged prior to the reception of the second downlink frame, and the refer- (Continued)

ence value is a common value among STAs related to a multi-user transmission.

10 Claims, 5 Drawing Sheets

(51) Int. Cl.
    *H04L 5/00*       (2006.01)
    *H04W 56/00*     (2009.01)
    *H04W 72/04*     (2009.01)
    *H04W 74/08*     (2009.01)
    *H04L 27/26*     (2006.01)

(52) U.S. Cl.
    CPC ...... *H04L 27/2662* (2013.01); *H04L 27/2675* (2013.01); *H04W 56/0015* (2013.01); *H04W 56/0065* (2013.01); *H04W 72/0446* (2013.01); *H04W 74/0816* (2013.01); *H04W 84/12* (2013.01); *H04L 5/0023* (2013.01); *H04L 5/0053* (2013.01)

(56) References Cited

U.S. PATENT DOCUMENTS

| | | |
|---|---|---|
| 2012/0140730 A1 | 6/2012 | Marks et al. |
| 2013/0229996 A1* | 9/2013 | Wang ................ H04W 72/0413 370/329 |
| 2013/0286959 A1* | 10/2013 | Lou ....................... H04W 72/04 370/329 |
| 2013/0301551 A1 | 11/2013 | Ghosh et al. |
| 2014/0126509 A1 | 5/2014 | You |
| 2014/0307650 A1* | 10/2014 | Vermani ............... H04L 5/0044 370/329 |

* cited by examiner

D1 = aRxRFDelay + aRxPLCPDelay (referenced from the end of thr last symbol of a frame on the medium)
D2 = D1 + Air Propagation Time
Rx/Tx = aRXTXTurnaroundTime (begins with a PHYTXSTART.request)
M1 = M2 = aMACProcessingDelay
CCAdel = aCCA Time -D1

METHOD FOR TRANSMITTING MULTI-USER FRAME IN WIRELESS LAN SYSTEM

CROSS-REFERENCE TO RELATED APPLICATIONS

This application is the National Stage filing under 35 U.S.C. 371 of International Application No. PCT/KR2015/005472, filed on Jun. 1, 2015, which claims the benefit of U.S. Provisional Application No. 62/006,241, filed on Jun. 1, 2014, the contents of which are all hereby incorporated by reference herein in their entirety.

TECHNICAL FIELD

The present invention relates to a method of transmitting a multi-user frame in a wireless communication system and a station device for performing the same.

BACKGROUND ART

First of all, a wireless local area network (WLAN) system is described as one example of a system to which the present invention is applicable.

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

The aforementioned WLAN standard uses a bandwidth up to maximum 160 MHz and supports 8 spatial streams, and there is an ongoing discussion about IEEE 802.11ax standardization through IEEE 802.11ac standard supportive of a speed of maximum 1 Gbit/s.

DISCLOSURE OF THE INVENTION

Technical Task

The technical task of the present invention is to provide a method of transmitting a multi-user frame, and more particularly, how an STA handles synchronization for a multi-user frame transmission.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting a multi-user frame by an STA in a wireless communication system, including receiving a second downlink frame including time synchronization information and frequency synchronization information from an AP (access point), adjusting time synchronization and frequency synchronization using the time synchronization information and the frequency synchronization information, receiving a third downlink frame including MU frame assignment information, and transmitting an MU frame according to the MU assignment information, wherein the time synchronization information is determined in a manner of comparing a difference between measurement values for frames exchanged before the reception of the second downlink frame with a reference value and wherein the reference value includes a value common to multi-user transmission related STAs.

In another technical aspect of the present invention, provided herein is an STA device in transmitting a multi-user (MU) frame in a wireless communication system, including a receiving module and a processor configured to receive a second downlink frame including time synchronization information and frequency synchronization information from an AP (access point), adjust time synchronization and frequency synchronization using the time synchronization information and the frequency synchronization information, receive a third downlink frame including MU frame assignment information, and transmit an MU frame according to the MU assignment information, wherein the time synchronization information is determined in a manner of comparing a difference between measurement values for frames exchanged before the reception of the second downlink frame with a reference value and wherein the reference value is common to multi-user transmission related STAs.

The embodiment may further include receiving a first downlink frame and transmitting a first uplink frame in response to the first downlink frame.

The frames exchanged before the reception of the second downlink frame may include the first downlink frame and the first uplink frame.

The frames exchanged before the reception of the second downlink frame may include a measurement value of an end timing of the first downlink frame and a measurement value of a start timing of the first uplink frame.

The embodiment may further include transmitting a second uplink frame to the AP, and the second downlink frame may be a response to the second uplink frame.

The frequency synchronization information may be obtained from a preamble of the second uplink frame.

The preamble may include an STF (short training field) and an LTS (long training field) of the second uplink frame.

If the second uplink frame includes a data frame, the second downlink frame may include a reception acknowledgement frame for the data frame.

If the second uplink frame includes an RTS (request to send) frame, the second downlink frame may include a CTS frame.

Each of the first uplink frame, the first downlink frame, the second uplink frame and the second downlink frame may include a single user frame.

The embodiment may further include receiving a first downlink frame and transmitting a first uplink frame in response to the first downlink frame, and the second downlink frame may be received after a preset time after the first uplink frame has been transmitted.

The frequency synchronization information may be obtained from a preamble of the first uplink frame.

The reference value may include an SIFS (short interframe space) of 16 μs.

Advantageous Effects

According to the present invention, STAs can adjust synchronizations efficiently and transmit multi-user frames.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

In the following detailed description of the invention includes details to help the full understanding of the present invention. Yet, it is apparent to those skilled in the art that the present invention can be implemented without these details. Occasionally, to prevent the present invention from getting vaguer, structures and/or devices known to the public may be skipped or represented as block diagrams centering on the core functions of the structures and/or devices.

As mentioned in the foregoing description, the following description relates to a method of transmitting a frame in a WLAN system and station device for performing the same. To this end, a WLAN system to which the present invention is applied is described in detail.

Figure 1:
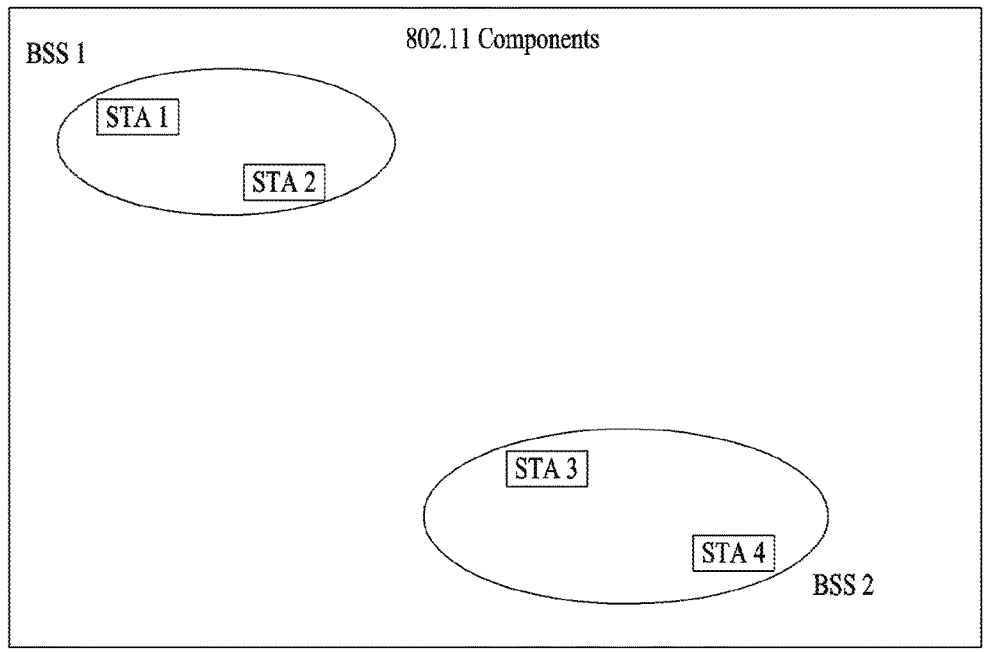
FIG. 1 is a diagram for one example of a configuration of a WLAN system.

FIG. 1 is a diagram for one example of a configuration of a WLAN system.

Referring to FIG. 1, a WLAN system includes at least one basic service set (BSS). The BSS is a set of stations (STAs) capable of communicating with each other by successfully establishing synchronization.

The STA is a logical entity including a medium access control (MAC) and a physical layer interface for a radio medium, and includes an access point (AP) STA and a non-AP STA (station). When it is simply called an AP, it indicates an AP STA. When it is called an STA, it may indicate a non-AP STA. The non-AP STA may be called another name such as a terminal, a wireless transmit/receive unit (WTRU), a user equipment (UE), a mobile station (MS), a mobile terminal, a mobile subscriber unit, or the like.

And, the AP is an entity that provides an associated STA, which is associated with the corresponding AP, with an access to a distribution system (DS) through a radio medium. The AP may be called a concentrated controller, a base station (BS), a Node-B, a BTS (base transceiver system), a site controller, or the like.

The BSS may be classified into an infrastructure BSS and an independent BSS.

The BSS shown in FIG. 1 is an IBSS. The IBSS means a BSS failing to include an AP. As the IBSS does not include the AP, an access to the DS is not granted, thereby configuring a self-contained network.

Figure 2:
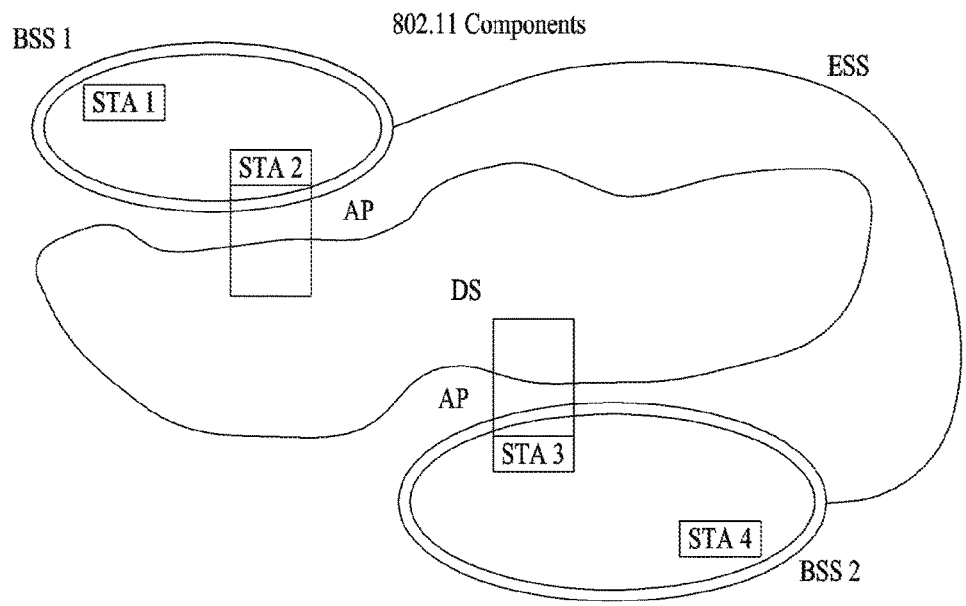
FIG. 2 is a diagram for another example of a configuration of a WLAN system.

FIG. 2 is a diagram for another example of a configuration of a WLAN system.

BSS shown in FIG. 2 is an infrastructure BSS. The infrastructure BSS includes at least one STA and at least one AP. In the infrastructure BSS, although communications between non-AP STAs are basically performed via AP, if a direct link is established between the non-AP STAs, a direct communication between the non-AP STAs is possible.

Referring to FIG. 2, a plurality of infrastructure BSSs may be mutually connected to each other through DS. A plurality of BSSs connected through DS are called an extended service set (ESS). STAs included in the ESS can communicate with each other. In the same ESS, a non-AP STA can move away from one BSS into another BSS by performing a seamless communication.

The DS is a mechanism for connecting a plurality of APs. It may be unnecessary for the DS to be a network. If the DS is able to provide a prescribed distribution service, no restriction is put on a type of the DS. For instance, the DS may include such a wireless network as a mesh network or a physical structure for connecting APs to each other.

Based on the above description, a frame structure usable in a WLAN system is described.

Figure 3:
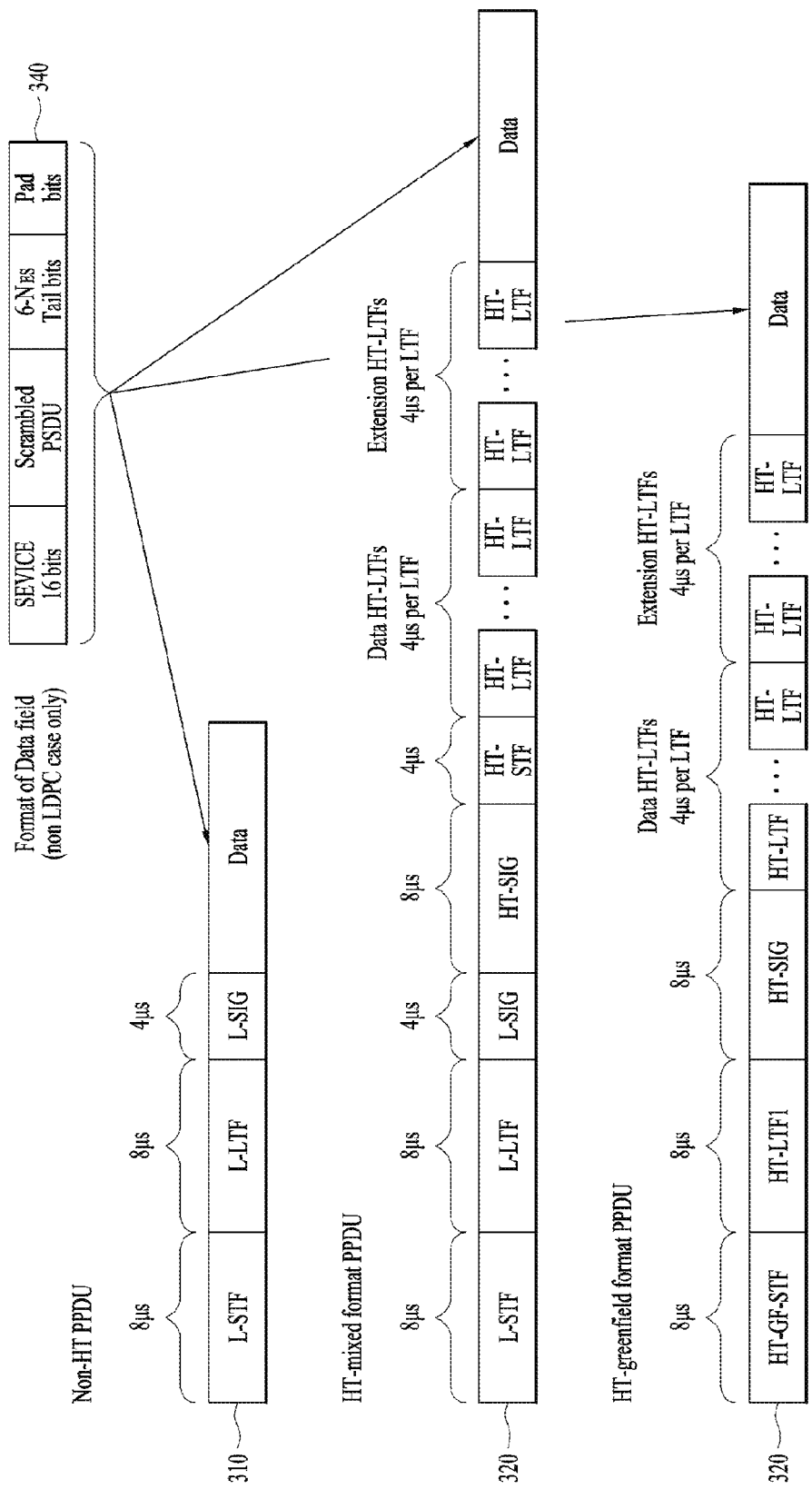
FIG. 3 is a diagram to describe a frame structure usable in a WLAN system.

FIG. 3 is a diagram to describe a frame structure usable in a WLAN system.

In particular, a reference number '310' shown in FIG. 3 denotes a physical layer protocol data unit (PPDU) for user equipments according to IEEE 802.11a/g standard, and reference numbers 320 and 330 denote PPDU formats for user equipments according to IEEE 802.11n standard. As shown in FIG. 3, a user equipment supportive of IEEE 802.11n system uses a frame denoted by 'HT-'.

In more particular, the reference number 320 and the reference number 330 denote HT-mixed format PPDU and HT-greenfield format PPDU of IEEE 802.11n user equipment, respectively.

A reference number 340 denotes a configuration of a data region in each PPDU, and the data region includes PSDU (Physical Service Data Unit).

Figure 4:
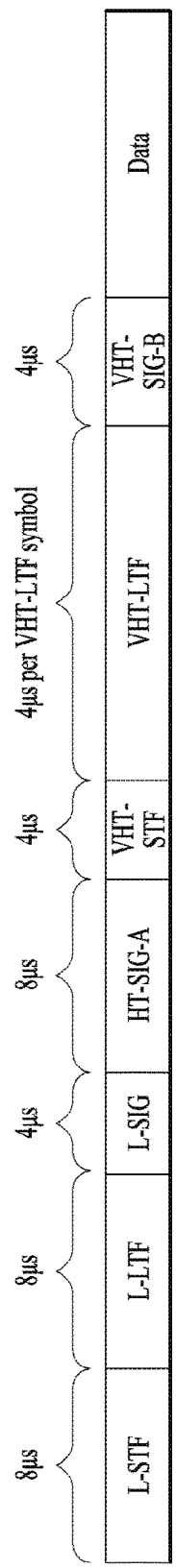
FIG. 4 shows a frame format according to IEEE 802.11ac standard technology.

FIG. 4 shows a frame format according to IEEE 802.11ac standard technology.

Referring to FIG. 4, a user equipment according to IEEE 802.11ac standard supports a field denoted by 'VHT-'.

In particular, fields shown in FIG. 4 are described as follows.

TABLE 1

| Field | Description |
| --- | --- |
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |

TABLE 1-continued

| Field | Description |
| --- | --- |
| VHT-LTF | VHT Long Training field |
| VHT-SIG-B | VHT SIGNAL B field |
| Data | The Data field carries the PSDU(s) |

Inter-Frame Space (IFS)

A time space between two frames may be defined as IFS (inter-frame space). An STA may determine whether a channel is used for IFS through a carrier sensing. A DCF MAC layer defines 4 types of IFSs, by which a priority in occupying a radio medium can be determined.

IFS may be set to a specific value according to a physical layer irrespective of a bit rate of STA. Types of IFS may include SIFS (Short IFS), PIFS (PCF IFS), DIFS (DCF IFS), and EIFS (Extended IFS). The SIFS (Short IFS) is used for RTS/CTS and ACK frame transmission and may have a top priority. The PIFS (PCF IFS) is used for PCF frame transmission, and the DIFS (DCF IFS) may be used for DCF frame transmission. The EIFS (Extended IFS) is used for a case of frame transmission error occurrence only and does not have a fixed space.

Figure 5:
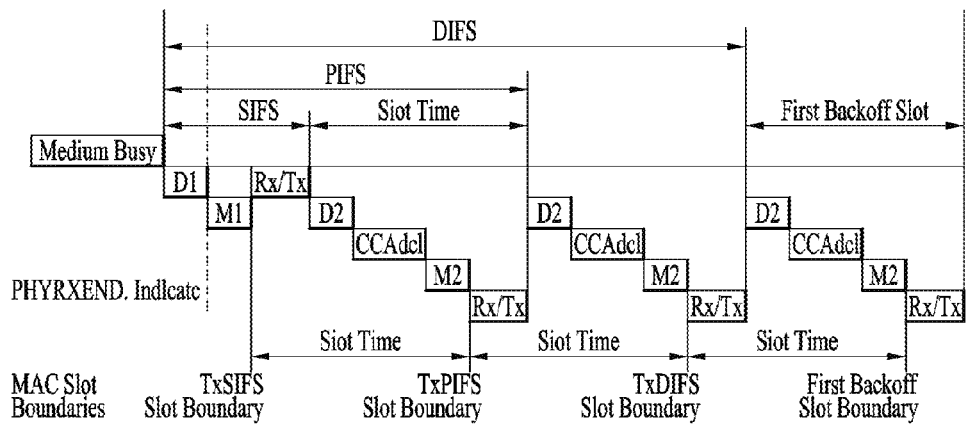
FIG. 5 is a diagram to describe a frame time gap.

Each relationship between the respective IFSs is defined as a time gap on a medium, and related attributes are provided by a physical layer, as shown in FIG. 5.

FIG. 5 is a diagram for one example of IFS relationship. Regarding all medium timings, an end timing point of a last symbol of a PPDU indicates a transmission end, and a first symbol of a preamble of a next PPDU indicates a transmission start. All MAC timings can be defined by referring to PHY-TXEND.confirm primitive, PHYTXSTART.confirm primitive, PHY-RXSTART.indication primitive and PHY-RXEND.indication primitive.

Referring to FIG. 5, an SIFS time (aSIFSTime) and a slot time (aSlotTime) may be determined per physical layer. The SIFS time has a fixed value, and the slot time may dynamically change according to an air propagation time (aAirPropagationTime) change. SIFS, PIFS and DIFS can be defined as Formulas 1 to 3, respectively. And, a value within a parenthesis in each formula includes a numerical value that is used in general. Yet, such a value may vary per user equipment and/or location.

$$aSIFS(16us) = aRXRFDelay(0.5) + aRXPLCPDelay(12.5) + aMACProcessingDelay(11 \text{ or } <2) + aRXTXturnaroundTime(<2) - aRxTxTurnaroundTime = aTxPLCPDelay(1) + aRxTxSwitchTime(0.25) + aTxRampOnTime(0.25) + aTxRFDelay(0.5) \quad [\text{Formula 1}]$$

$$PIFS(25 \text{ us}) = aSIFSTime + aSlotTime$$
$$aSlotTime = aCCATime(<4) + aRxTxTurnaroundTime(<2) + aAirPropagationTime(<1) + aMACProcessingDelay(<2) \quad [\text{Formula 2}]$$

(aAirPropagationTime: The default PHY parameter are based on aAirPropagationTime Having a value of 1 us or less. Radio wavespropagate at 300 m/us in free space, and, for example, 3 us would be the ceiling for BSS maximum one-way distance of ~450 m (~900 m round trip))

$$DIFS(34us) = aSIFSTime + 2*aSlotTime \quad [\text{Formula 3}]$$

Meanwhile, a method of transmitting a multi-user (MU) frame according to an embodiment of the present invention is described with reference to FIG. 6 and FIG. 7 as follows.

Figure 6:
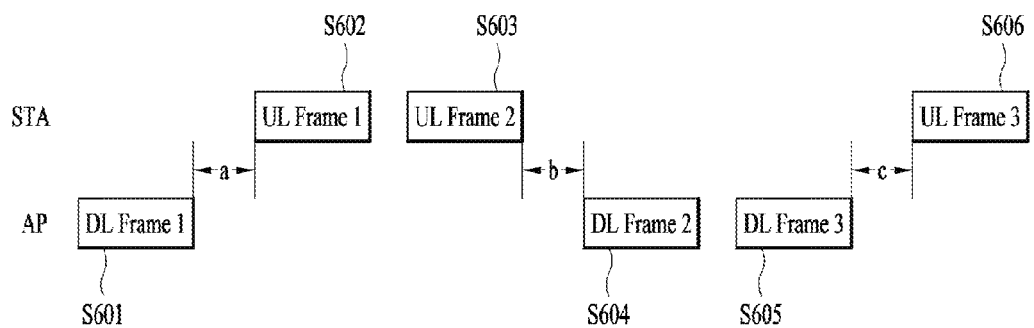
FIG. 6 and FIG. 7 are diagrams to describe a method of transmitting a multi-user frame according to an embodiment of the present invention.

Referring to FIG. 6, an STA may receive a first DL (downlink) frame from an AP [S601] and then transmit a first UL (uplink) frame in response to the first DL frame [S602]. Thereafter, the STA may transmit a second UL frame to the AP [S603] and then receive a second DL frame including time synchronization information and frequency synchronization information from the AP [S604]. A third DL frame including MU frame assignment information is transmitted. Namely, the STA may receive the third DL frame including the MU frame assignment information [S605]. The STA may transmit an MU frame according to the MU frame assignment information [S606].

In the above frame exchange procedure, the time synchronization information may be determined in a manner of comparing a difference of measurement values for frames exchanged before the reception of the second DL frame with a reference value. In this case, the frames exchanged before the reception of the second DL frame may include the first UL frame and the second UL frame, and the measurements values for the frames exchanged before the reception of the second DL frame may include a measurement value of an end timing of the first DL frame and a measurement value of a start timing of the first UL frame. Herein, the reference value may include a value (e.g., SIFS of 16 μs) common/fixed to multi-user transmission related (or MU capable) STAs. Or, the reference value may include a value (e.g., SIFS of 16 μs) common/fixed to all STAs. Or, the reference value may include a value (e.g., SIFS of 16 μs) common/fixed to all STAs or multi-user transmission related (or, MU capable) STAs only if a specific indication (e.g., indication indicating a usage for a timing measurement, etc.) exists in the first DL frame. In FIG. 6, if an interval 'a' between the first DL frame and the first UL frame is different for each STA, it is difficult for the AP to measure a timing. Hence, as mentioned in the foregoing description, such values are used as the fixed values. With such configuration, the AP can obtain timing synchronization information by measuring a difference between an end timing of the first DL frame and a start timing of the first UL frame. The first DL frame may include a measurement indication. And, the first DL frame may include any frame corresponding to a DL frame transmitted by the AP. If the first frame is a DL data frame, the first UL frame may include a (block) ACK frame.

The frequency synchronization information may be obtained from a preamble (STF (Short Training field) and LTF (Long Training field)) of the first UL frame.

Or, the frequency synchronization information may be obtained from a preamble of the second UL frame. Herein, the preamble may include STF (Short Training field) and LTF (Long Training field) of the second UL frame. If the second UL frame is a data frame, the second DL frame may include a reception acknowledgement frame in response to the data frame. If the second UL frame is an RTS (request to send) frame, the second DL frame may include a CTS frame. The second UL frame may include buffer state information of the STA.

In the above description, the third DL frame may include an MU assignment frame including MU assignment frame and the like. After end of transmission, several STAs may simultaneously send UL MU frames. And, it is able to secure a processing time of STA in a manner of inserting several dummy data in a rear part as well as data necessary for the MU assignment frame. In case that time synchronization information and frequency synchronization information are included in the MU assignment frame, the second UL frame may be sent without such information.

Each of the first UL frame, the first DL frame, the second UL frame and the second DL frame may include a single user frame.

Figure 7:
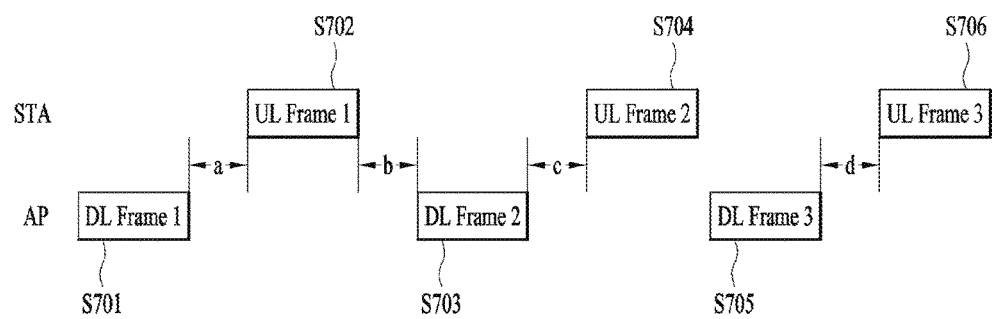

FIG. 7 shows an example of a method of transmitting a multi-user (MU) frame according to another embodiment of the present invention. Referring to FIG. 7, An STA may receive a first DL frame from an AP [S701]. The first DL frame may include a DL data frame, an association related frame, or a management frame (e.g., a beacon frame, etc.). Or, the first DL frame may include a new synch initiation frame. The first DL frame may contain an indication indicating that it is a frame for timing/frequency correction.

In response to the first DL frame, the STA may send a first UL frame [S702]. The STA may receive a second DL frame containing time synchronization information and frequency synchronization information from the AP [S703].

The time synchronization information may be determined in a manner of comparing a difference of measurement values for frames of the first DL frame and the second UL frame with a reference value. In this case, the measurements values may include a measurement value of an end timing of the first DL frame and a measurement value of a start timing of the first UL frame. Herein, the reference value may include a value (e.g., SIFS of 16 µs) common/fixed to multi-user transmission related (or MU capable) STAs. Or, the reference value may include a value (e.g., SIFS of 16 µs) common/fixed to all STAs. Or, the reference value may include a value (e.g., SIFS of 16 µs) common/fixed to all STAs or multi-user transmission related (or, MU capable) STAs only if a specific indication (e.g., an indication indicating a usage for a timing measurement, etc.) exists in the first DL frame.

And, the frequency synchronization information may be obtained from a preamble STF and LTF of the first UL frame. If the first UL frame is a random access channel, several user equipments simultaneously send it, and other STAs may identify it using different codes.

The AP may send a second DL frame containing time synchronization information and frequency synchronization information [S704]. Having received it, the STA may adjust time synchronization and frequency synchronization using the time synchronization information and the frequency synchronization information. In response to the second DL frame, the STA may send a second UL frame. The second UL frame may be configured to be sent as a NACK frame only if an error occurs.

Thereafter, the STA may receive a frame containing MU assignment information and a third DL frame and then send a third UL frame (i.e., an MU frame) [S706].

Device Configuration According to Embodiment of Present Invention

Figure 8:
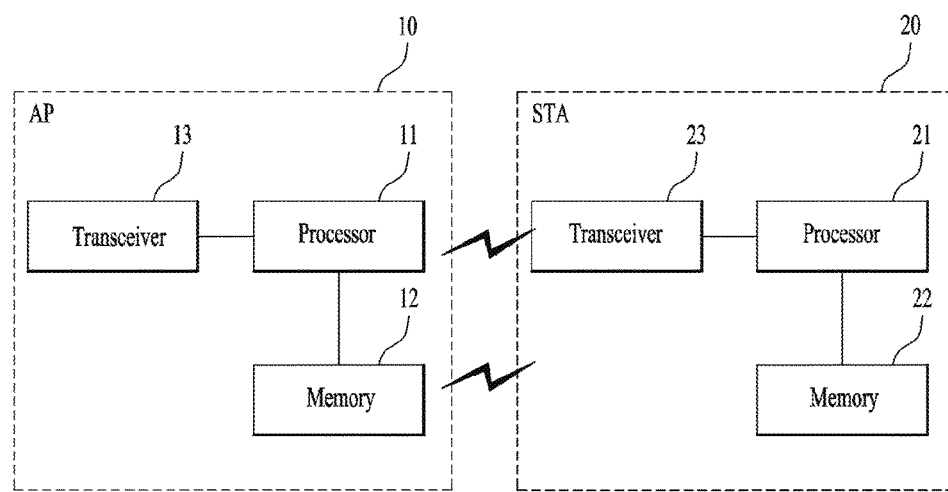
FIG. 8 is a diagram to illustrate a configuration of a transceiving device.

FIG. 8 is a diagram for a configuration of a wireless device according to one embodiment of the present invention.

An AP 10 may include a processor 11, a memory 12 and a transceiver 13. An STA 20 may include a processor 21, a memory 22 and a transceiver 23. The transceiver 13/23 may transmit/receive a wireless signal, and may implement a physical layer according to IEEE 802 system for example. The processor 11/21 is connected to the transceiver 13/21, thereby implementing a physical layer and/or a MAC layer according to IEEE 802 system. The processor 11/21 may be configured to perform operations according to the aforementioned various embodiments of the present invention. Moreover, a module configured to implement an operation of the AP/STA according to the aforementioned various embodiments of the present invention is saved to the memory 12/13 and can be executed by the processor 11/21. The memory 12/22 may be installed inside or outside the processor 11/21 so as to be connected to the processor 11/21 through a means known to the public.

The processor 21 of the STA 20 receives a second DL frame including time synchronization information and frequency synchronization information from an AP (access point), adjusts time synchronization and frequency synchronization using the time synchronization information and the frequency synchronization information, receives a third DL frame including the MU frame assignment information, and sends an MU frame according to the MU assignment information. The time synchronization information is determined in a manner of comparing a difference between measurement values of frames exchanged before the reception of the second DL frame with a reference value. And, the reference value may be common to STAs related to a multi-user transmission.

In the above-mentioned detailed configurations of the AP and STA devices, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description are applicable to various kinds of mobile communication systems.

What is claimed is:

1. A method of transmitting a multi-user frame by an STA in a wireless communication system, comprising:
   receiving a first downlink frame;
   transmitting a first uplink frame in response to the first downlink frame;
   transmitting a second uplink frame to a AP (access point) for requesting a second downlink frame;
   receiving the second downlink frame including time synchronization information and frequency synchronization information from the AP;
   adjusting time synchronization and frequency synchronization using the time synchronization information and the frequency synchronization information;
   receiving a third downlink frame including MU frame assignment information; and
   transmitting an MU frame according to the MU assignment information,
   wherein the time synchronization information is determined in a manner of comparing a difference between measurement values for frames exchanged before the reception of the second downlink frame with a reference value
   wherein the reference value comprises a value common to multi-user transmission related STAs, and
   wherein the frequency synchronization information is obtained from a preamble of the second uplink frame.

2. The method of claim 1, wherein the frames exchanged before the reception of the second downlink frame comprise the first downlink frame and the first uplink frame.

3. The method of claim 1, wherein the frames exchanged before the reception of the second downlink frame comprise a measurement value of an end timing of the first downlink frame and a measurement value of a start timing of the first uplink frame.

4. The method of claim 1, wherein the preamble comprises an STF (short training field) and an LTS (long training field) of the second uplink frame.

5. The method of claim 1, wherein if the second uplink frame comprises a data frame, the second downlink frame comprises a reception acknowledgement frame for the data frame.

6. The method of claim 1, wherein if the second uplink frame comprises an RTS (request to send) frame, the second downlink frame comprises a CTS frame.

7. The method of claim 1, wherein each of the first uplink frame, the first downlink frame, the second uplink frame and the second downlink frame comprises a single user frame.

8. The method of claim 1,
   wherein the second downlink frame is received after a preset time after the first uplink frame has been transmitted.

9. The method of claim 1, wherein the reference value comprises an SIFS (short inter-frame space) of 16 μs.

10. In transmitting a multi-user (MU) frame in a wireless communication system, an STA device, comprising:
    a receiving module; and
    a processor configured to:
       receive a first downlink frame,
       transmit a first uplink frame in response to the first downlink frame,
       transmit a second uplink frame to a AP (access point) for requesting a second downlink frame,
       receive the second downlink frame including time synchronization information and frequency synchronization information from the AP,
       adjust time synchronization and frequency synchronization using the time synchronization information and the frequency synchronization information,
       receive a third downlink frame including MU frame assignment information, and
       transmit an MU frame according to the MU assignment information,
    wherein the time synchronization information is determined in a manner of comparing a difference between measurement values for frames exchanged before the reception of the second downlink frame with a reference value
    wherein the reference value is common to multi-user transmission related STAs, and
    wherein the frequency synchronization information is obtained from a preamble of the second uplink frame.

* * * * *